Patented Nov. 6, 1945

2,388,659

UNITED STATES PATENT OFFICE 2,388,659

MANUFACTURE OF PIGMENTS

Lonnie W. Ryan, Westfield, N. J., and Herbert L. Sanders, New York, N. Y., assignors to Interchemical Corporation, New York, N. Y., a corporation of Ohio No Drawing. Application July 12, 1943, Serial No. 494,374

9 Claims. (Cl. 23—200)

This invention relates to new and useful improvements in the manufacture of hydrated iron oxide pigments and in particular to the precipitation of such pigments from solutions of salts of iron.

Hydrated iron oxide pigments vary in color from lemon yellow to dark brown. They also vary considerably in hiding power, tinting strength and tint tone. Their composition is essentially ferric oxide monohydrate ($Fe_2O_3.H_2O$). They are widely used in paints, including paints for military purposes, such as for camouflage, and for olive drab colors for trucks, tanks, and other military equipment.

Prior to our invention, hydrated iron oxide pigments of best quality particularly in color, tinting strength, and hiding power have been manufactured by corroding scrap iron, by circulating a solution of ferrous sulfate through a body of scrap iron, while at the same time aerating, for a period of a week or more.

We have discovered a method whereby hydrated iron oxide pigments, which are comparable in quality to those manufactured by corroding scrap iron, may be manufactured by precipitation from iron salt solutions with alkaline reagents.

Hydrated iron oxide pigments have been prepared by precipitation from iron salt solutions with alkaline reagents prior to our invention, but insofar as we are aware, products comparable in color, tinting strength, and hiding power to those prepared from scrap iron have not been prepared by such precipitation methods.

One such prior art process (Fireman U. S. 1,392,927) consists in adding hydrated lime, in such quantities as to precipitate only a part of the iron, to a solution of ferrous chloride while continuously introducing air into the ferrous chloride solution, introducing steam to raise the temperature to 105° F. to 130° F. and continuing aeration at temperatures between 105° F. and 130° F., until oxidation of the precipitate is complete.

Another such prior art process (Fireman U. S. 1,392,925 and 1,424,635), consists in adding hydrated lime to an aqueous solution of ferrous chloride in sufficient quantity to precipitate from 75% to 85% of the iron, introducing air and steam during and after precipitation of the iron, the steam being introduced at such a rate that the temperature does not rise above about 100° F., until oxidation brings the ratio of ferrous to ferric iron to about 1 to 0.5, gradually increasing the steam until the boiling temperature is reached, and then continuously introducing steam and air, at the boiling temperature, until the precipitate is oxidized completely to ferric oxide. A modification of this procedure consists in adding sodium carbonate in considerable excess to a ferrous chloride solution while injecting both air and steam, raising the temperature during the course of one hour to 110° F., during one hour to 140° F., during one hour to 160° F., maintaining the temperature at 160° F. until all of the ferrous oxide is oxidized to ferric and then raising the temperature to the boiling point and boiling for about one-half hour.

Other modifications consist in oxidizing the precipitated ferrous hydroxide under different conditions of temperature and time whereby yellow to brown precipitates are obtained.

In another prior art process (Ott and Schussler U. S. 1,840,326), the method consists in precipitating ferrous hydroxide from a ferrous salt solution by adding a small amount of a basic substance, such as sodium carbonate, hydrated lime, etc., rapidly oxidizing the precipitate by adding an excess of an oxidizing agent such as a ferric salt and then, while continuously aerating and heating, adding a basic substance such as sodium carbonate until all of the iron in solution has been substantially completely precipitated, the addition of the basic substance being at such a rate that the precipitated ferrous hydroxide is oxidized by the air immediately after precipitation, thus avoiding the presence of a substantial amount of ferrous hydroxide during precipitation. A modification of this process consists in having present in the ferrous salt solution, prior to precipitation with the basic substance, a substantial amount of a salt of a trivalent metal such as aluminum.

In none of these prior art processes, in which hydrated iron oxide is precipitated from an iron salt solution by the addition of alkaline reagents, and then oxidized, are products obtained which compare with our products in color, tinting strength, and hiding power.

Our invention comprises in its broadest aspect precipitating hydrated ferric oxide, in the presence of a previously prepared seed, from iron salt solutions, by the addition of alkaline reagents under such conditions of acidity that ferrous hydroxide or hydrous ferrous oxide will either not precipitate or will immediately redissolve.

In our process the preferred source of iron is copperas which is a waste by-product, available in large quantities, from pickle liquors from the tinning and galvanizing industry and also from the titanium dioxide pigment industry. Other salts of iron such as ferrous chloride, ferric sulphate, etc. or mixtures of these salts may, however, be used without departing from the scope of the invention.

The preferred seed is an hydrated ferric oxide prepared by adding an alkaline reagent to a solution of a ferrous salt and then oxidizing the precipitated ferrous hydroxide, during a period of several hours, by introducing air into the seed precipitation vessel. In a preferred procedure the alkaline reagent is sufficient to precipitate only a part of the iron.

In the preferred precipitation of the pigment a small amount of this seed is added to a solution of a ferrous salt such as copperas, and provides nuclei or precipitation centers for the later precipitation of the pigment. The pigment is precipitated at an elevated temperature by adding an alkaline reagent such as sodium carbonate during a period of several hours at such a rate that the pH of the solution remains under about 3.5 to 4.0, at which pH ferrous hydroxide does not precipitate or, if precipitated locally by a local excess of the alkaline reagent, immediately redissolves. Precipitation of ferrous hydroxide is to be avoided. During the addition of the alkaline reagent the precipitation mass is stirred with a mechanical agitator and air and steam are introduced continuously.

Ferric oxide monohydrate ($Fe_2O_3.H_2O$) appears in nature in two polymorphic crystalline forms—goethite and lepidocrocite—and also in an amorphous condition—limonite. Limonite is considered to be essentially isotropic ferric oxide monohydrate with adsorbed and capillary water. Both goethite and lepidocrocite are in the orthorhombic crystal system. (Posnjak and Merwin, The American Journal of Science, 47, 311) (1919).

Electron miscrographs at 8000 to 10000 diameters show our preferred seed particles to have a needle-like shape and our finished pigment particles to be similar in shape but larger particularly in their shortest dimensions. Apparently, the seed particles grow during the precipitation. X-ray diffraction patterns show our preferred seed to be in some cases entirely goethite in structure and in other cases partly goethite and partly lepidocrocite in structure. All samples of our finished pigments which we have had examined under X-rays have shown goethite structure only.

While we do not wish to be limited by a theory as to the mechanism of the precipitation reaction, it is our belief that the reaction proceeds as follows: Aeration causes the formation of some ferric iron. The addition of the alkaline reagent raises the pH of the solution to the point at which, at the elevated temperature, ferric iron is relatively rapidly precipitated as hydrated ferric oxide, by hydrolysis, and maintains the pH at this point by neutralizing the acid set free by hydrolysis. Aeration causes continuous oxidation of any ferrous iron present to ferric. Hydrated ferric oxide precipitates on the seed particles present and gradually grows to the larger crystals which have good pigment properties.

When the precipitation is carried out under identical conditions except that no seed is present the final pigment obtained is dark brown in color, low in tinting strength and low in opacity or hiding power. The final pigment particles when examined under the electron microscope at 8000 to 10000 diameters magnification show little or no crystalline form, by X-rays appear to be amorphous and under the Petrographic microscope appear to have physical properties like those of the natural material called limonite which is essentially the mineral goethite in many small crystallites variously aggregated.

The seed itself, when filtered and dried, has little or no value as a pigment. When mixed with a paint vehicle, the color is dark brown and the mixture has very little hiding power.

We have learned that the color and other properties of our pigment may be varied, considerably, by varying such precipitation conditions as time, temperature, the kind and concentration of iron salt or salts used, etc., and by varying the kind and amount of seed used.

The quality of the preferred seed is also affected by precipitation conditions such as concentrations, amount of excess ferrous salt present, rate of aeration, temperature and also by the alkaline precipitation reagent used. For example, when the seed is prepared by precipitating with calcium hydroxide it is necessary to use more of such seed than of a seed prepared by precipitating with sodium hydroxide, other conditions being equal, in order to obtain pigments of the same quality.

The finished pigment may itself be used as a seed, and when so used, the resultant precipitate is considerably improved over that obtained in the absence of a seed, although the pigment is inferior to that obtained when our preferred seed is used. Our preferred seed, therefore, should be smaller than the final pigment particle size and shows a marked structure under X-ray analysis.

By our process pigments varying in color from a lemon yellow to a reddish brown, in tint tone from a clean, light yellow to a reddish yellow, and also varying considerably in opacity or hiding power, may be produced by varying particularly the kind and amount of seed used. The amount of seed used in general varies between about 1% and about 20%, based upon the weight of the finished pigment, depending upon its properties and also upon the properties desired in the finished pigment. We do not wish, however, to be limited to the use of these amounts of seed since it may be desirable to produce a pigment with properties such as may be obtained by using a still larger amount of seed.

In general, within certain limits, the more seed of any particular kind used, the lighter the color, the cleaner the tint tone, and the greater the hiding power and tinting strength; and the less of the same seed used the darker the color, the redder the tint tone, and the lower the hiding power and tinting strength. When a very small amount of seed (say about 2% or less) is used the final product as disclosed by electron micrographs is a mixture of relatively large and very small needle-like crystals and small, apparently amorphous, particles.

In the preparation of the preferred seed, alkaline compounds or mixtures of alkaline compounds are used. If, however, ferrous sulphate is the source of iron the precipitant should preferably be one which does not form a highly insoluble sulphate. Sodium carbonate, sodium hydroxide, calcium hydroxide, magnesium oxide, potassium hydroxide, potassium carbonate, and ammonium hydroxide are examples of reagents which we have satisfactorily used.

We have not prepared an entirely satisfactory seed from ferric salts. For example, when a solution of sodium hydroxide is added to a solution of ferric sulphate, a dark brown precipitate is obtained which under both X-ray and electron microscope examination appears to be amorphous. When such a product is used as a precipitation seed the final pigment obtained is dark brown in color and low in hiding power.

Examples 1, 2, and 3 illustrate seed preparations.

Example 1

To 4500 gallons of a copperas solution, at 70° to 80° F., containing 7080 pounds of copperas ($FeSO_4 7H_2O$), are added, during one half hour, 500 gallons of a sodium hydroxide solution, containing 1018 pounds of sodium hydroxide, while continuously stirring with a mechanical agitator. Air is then introduced at the rate of about 100 cubic feet per minute and stirring is continued for a period of about 40 hours. During this time the pH of the solution, as determined with the glass electrode, drops from about 5.5 to about 3.0 and the color of the precipitate gradually changes from a blue green to a light yellow.

Example 2

To 4500 gallons of a copperas solution, at 70° to 80° F., containing 4430 pounds of copperas ($FeSO_4 7H_2O$), are added, during the one half hour, 500 gallons of a sodium carbonate solution, containing 1335 pounds of sodium carbonate, while continuously stirring with a mechanical agitator. Air is then introduced at the rate of about 100 cubic feet per minute and stirring is continued for a period of about 40 hours. During this time the pH of the solution, as determined with the glass electrode, drops from about 6.0 to about 3.0 and the color of the precipitate gradually changes from a blue green to a light brown.

Example 3

To 4500 gallons of a copperas solution, at 70° to about 80° F., containing 4430 pounds of copperas ($FeSO_4 7H_2O$), are added, during one half hour, 500 gallons of an aqueous slurry, containing 930 pounds of hydrated lime ($Ca(OH)_2$), while continuously stirring with a mechanical agitator. Air is then introduced at the rate of about 100 cubic feet per minute and stirring is continued for a period of about 40 hours. During this time the pH of the solution, as determined with the glass electrode, drops from about 4.8 to about 3.0 and the color of the precipitate gradually changes from a blue green to a light greenish yellow.

Examples 4, 5, 6, 7, and 8 illustrate preparations of finished pigments.

Example 4

To 620 gallons of the seed slurry of Example 1, containing 140 pounds of ferric oxide monohydrate ($Fe_2O_3 \cdot H_2O$), are added 1250 gallons of a copperas solution containing 5000 pounds of copperas ($FeSO_4 7H_2O$). The mixture is diluted with water to 3200 gallons while stirring with a mechanical agitator. Steam is introduced and the temperature is brought to 182° F. Air is then introduced at the rate of about 350 cubic feet per minute and a 10% solution of sodium carbonate is added at the rate of about 150 gallons per hour, while continuously stirring and aerating and maintaining a temperature of about 182° F., until all of the iron present has been precipitated. During the addition of the sodium carbonate the pH of the slurry is maintained at about 3.2 to about 3.5. The precipitate is filtered out, washed substantially free of water-soluble salts, dried and disintegrated.

The finished pigment when mixed with a paint vehicle is lemon yellow in color and high in hiding power and tinting strength. When mixed in a paint vehicle with a white opaque pigment, such as zinc oxide, the color is a clean light yellow.

Example 5

To 118 gallons of the seed slurry of Example 1 containing 26.3 pounds of ferric oxide monohydrate ($Fe_2O_3 H_2O$), are added 1125 gallons of a copperas solution containing 4500 pounds of copperas ($FeSO_4 7H_2O$). The mixture is diluted with water to 2500 gallons while stirring with a mechanical agitator.

Steam is introduced and the temperature is brought to 182° F. Air is then introduced at the rate of about 350 cubic feet per minute and a 10% solution of sodium carbonate is added at the rate of about 150 gallons per hour, while continuously stirring and aerating and maintaining a temperature of about 182° F., until substantially all of the iron present has been precipitated.

During the addition of the sodium carbonate the pH of the slurry is maintained at about 3.2 to about 3.5. The precipitate is filtered out, washed substantially free of water soluble salts, dried and disintegrated.

The finished pigment when mixed with a paint vehicle is dark yellow in color, slightly lower in tinting strength and considerably lower in hiding power than the pigment of Example 4. When mixed in a paint vehicle with an opaque pigment, such as zinc oxide, the color is a light reddish yellow.

Example 6

To 620 gallons of the seed slurry of Example 2, containing 140 pounds of ferric oxide monohydrate ($Fe_2O_3 H_2O$), are added 1360 gallons of a copperas solution containing 5340 pounds of copperas ($FeSO_4 7H_2O$). The mixture is diluted with water to 3200 gallons while stirring with a mechanical agitator. Steam is introduced and the temperature is brought to 182° F. Air is then introduced at the rate of about 350 cubic feet per minute and a 10% solution of sodium carbonate is added at the rate of about 150 gallons per hour, while continuously stirring and aerating and maintaining a temperature of about 182° F., until substantially all of the iron present has been precipitated. During the addition of the sodium carbonate the pH of the slurry is maintained at about 3.2 to about 3.5. The precipitate is filtered out, washed substantially free of water soluble salts, dried and disintegrated.

The finished pigment when mixed with a paint vehicle is light reddish brown in color, slightly lower in tinting strength and considerably lower in hiding power than the product of Example 4. When mixed in a paint vehicle with an opaque white pigment, such as zinc oxide, the color is a light reddish yellow.

Example 7

To 620 gallons of the seed slurry of Example 3 containing 140 pounds of ferric oxide monohydrate ($Fe_2O_3 H_2O$) are added 1360 gallons of a copperas solution containing 5340 pounds of copperas ($FeSO_4 7H_2O$). The mixture is diluted with water to 3200 gallons while stirring with a mechanical agitator. Steam is introduced and the temperature is brought to 182° F. Air is then introduced at the rate of about 350 cubic feet per minute and a 10% solution of sodium carbonate is added at the rate of about 150 gallons per hour, while continuously stirring and aerating and maintaining a temperature of about 182° F., until substantially all of the iron present has been precipitated. During the addition of the sodium carbonate the pH of the slurry is maintained at about 3.2 to about 3.5. The precipitate is filtered out, washed substantially free of water soluble salts, dried and disintegrated.

The finished pigment when mixed with a paint vehicle is light reddish brown in color, slightly lower in tinting strength and considerably lower in hiding power than the product of Example 4. When mixed with an opaque white pigment, such as zinc oxide, the color is a light reddish yellow.

Example 8

To 1240 gallons of the seed slurry of Example 3, containing 280 pounds of ferric oxide monohydrate ($Fe_2O_3H_2O$), are added 1200 gallons of a copperas solution containing 4780 pounds of copperas ($FeSO_4 \cdot 7H_2O$). The mixture is diluted with water to 3200 gallons while stirring with a mechanical agitator. Steam is introduced and the temperature is brought to 182° F. Air is then introduced at the rate of about 350 cubic feet per minute and a 10% solution of sodium carbonate is added at the rate of about 150 gallons per hour, while continuously stirring and aerating and maintaining a temperature of about 182° F., until substantially all of the iron present has been precipitated. During the addition of the sodium carbonate the pH of the slurry is maintained at about 3.2 to about 3.5. The precipitate is filtered out, washed substantially free of water-soluble salts, dried and disintegrated.

The finished pigment when mixed with a paint vehicle is lemon yellow in color and high in tinting strength and hiding power. When mixed in a paint vehicle with a white opaque pigment, such as zinc oxide, the color is a clean light yellow. The finished pigment of Example 7 is comparable to that of Example 4.

Example 9

1240 gallons of the seed slurry of Example 1, containing 280 pounds of ferric oxide monohydrate ($Fe_2O_3H_2O$) is filtered, and the precipitate is washed substantially free of ferrous sulphate and charged into 5000 gallons of a ferric sulphate solution containing 3580 pounds of ferric sulphate ($Fe_2(SO_4)_3$). Steam is introduced and the temperature is brought to 182° F. A 10% solution of sodium carbonate is added at the rate of about 150 gallons per hour, while continuously stirring and maintaining a temperature of about 182° F., until all of the iron has been precipitated. During the addition of the sodium carbonate the pH of the slurry is maintained at about 1.7. The precipitate is filtered out, washed substantially free of water soluble salts, dried and disintegrated.

The finished pigment when mixed with a paint vehicle is reddish brown in color, slightly lower in tinting strength and considerably lower in hiding power than the product of Example 4. When mixed in a paint vehicle with a white opaque pigment, such as zinc oxide, the color is a light reddish yellow.

Obviously, the above described examples may be indefinitely multiplied, without departing from the scope of our invention, which is defined in the claims. In particular, other ferrous salts may be used, and alkaline agents other than sodium carbonate, including sodium hydroxide, magnesium oxide, potassium hydroxide, potassium carbonate and ammonium hydroxide. Furthermore, we have shown precipitation with only our preferred seeds; our process envisages the use of any seed showing some goethite structure under X-ray analysis.

We claim:

1. A process for the manufacture of hydrated iron oxide pigments, which comprises precipitating hydrated ferric oxide from a ferrous salt solution in the presence of a previously prepared seed slurry of hydrated ferric oxide having goethite crystal structure and a particle size substantially less than that of the precipitated pigment, while maintaining such conditions that a ferrous hydroxide precipitate cannot be formed.

2. A process for the manufacture of hydrated iron oxide pigments, which comprises precipitating hydrated ferric oxide from a ferrous salt solution by adding an alkaline compound, while heating and aerating the solution in the presence of a previously prepared seed slurry of hydrated ferric oxide having goethite crystal structure and a particle size substantially less than that of the precipitated pigment, while maintaining such conditions that a ferrous hydroxide precipitate cannot be formed.

3. A process for the manufacture of hydrated iron oxide pigments, which comprises precipitating hydrated ferric oxide from a ferrous salt solution by adding an alkaline compound while heating and aerating the solution in the presence of a previously prepared seed slurry of hydrated ferric oxide having goethite crystal structure and a particle size substantially less than that of the precipitated pigment, and maintaining the solution at a pH of below about 4.0, whereby a ferrous hydroxide precipitate cannot be formed.

4. The method of manufacturing hydrated ferric oxide pigments from copperas and similar ferrous salt solutions, which comprises adding an alkaline compound to the heated, aerated solution in a quantity such that the pH of the solution does not rise above about 4.0, and ferric hydrate is precipitated free from admixture with ferrous hydrate, the precipitation being conducted in the presence of from 1 to 20%, based upon finished pigment weight, of a previously prepared seed slurry of hydrated ferric oxide characterized by goethite crystal structure and average particle size less than that of the finished pigment.

5. A process for the manufacture of hydrated iron oxide pigment which comprises mixing with a solution of a ferrous salt a previously prepared seed slurry of hydrated ferric oxide showing goethite structure, prepared by adding an alkaline reagent to a solution of a ferrous salt and oxidizing the precipitated ferrous hydroxide, and then precipitating hydrated ferric oxide from said solution on said seed while preventing the formation of a ferrous hydroxide precipitate by adding an alkaline reagent in a quantity that is insufficient to raise the pH above 4.0 while at the same time oxidizing the solution, whereby a hydrated iron oxide pigment having goethite structure is obtained.

6. A process for the manufacture of hydrated iron oxide pigment which comprises mixing with a solution of a ferrous salt a previously prepared seed of hydrated ferric oxide showing goethite structure, prepared by adding an alkaline reagent to a solution of a ferrous salt and oxidizing the precipitated ferrous hydroxide, and then precipitating hydrated ferric oxide from said solution on said seed by aerating and heating the solution while at the same time adding an alkaline reagent in such quantity and at such a rate as to maintain the pH under about 4.0, whereby a hydrated iron oxide pigment having goethite structure is obtained.

7. A process for the manufacture of hydrated iron oxide pigment which comprises mixing with a solution of a salt of iron a previously prepared seed of hydrated ferric oxide showing goethite structure, prepared by adding an alkaline reagent to a solution of a ferrous salt and oxidizing the precipitated ferrous hydroxide, and then precipitating further quantities of hydrated ferric oxide from said solution on said seed while maintaining the solution at a pH of below about 4.0, whereby a ferrous hydroxide precipitate cannot be formed.

8. A process for the manufacture of hydrated iron oxide pigments which comprises mixing a solution of a ferrous salt with a previously prepared seed slurry of hydrated ferric oxide showing goethite structure and precipitating further quantities of hydrated ferric oxide while oxidizing the solution and maintaining a pH under about 3.5 to 4.0.

9. A process for the manufacture of hydrated iron oxide pigments which comprises precipitating hydrated ferric oxide, in the presence of a previously prepared seed slurry of hydrated ferric oxide showing goethite structure, from a solution of a ferrous salt by aerating and heating the solution while at the same time adding an alkaline reagent in a quantity that is insufficient to raise the pH above 4.0.

LONNIE W. RYAN.
HERBERT L. SANDERS.